US012780553B2

(12) United States Patent
Suefuji

(10) Patent No.: US 12,780,553 B2
(45) Date of Patent: Nov. 3, 2026

(54) CONVEYOR BELT AND METHOD OF MANUFACTURING THE SAME

(71) Applicant: THE YOKOHAMA RUBBER CO., LTD., Hiratsuka (JP)

(72) Inventor: Ryotaro Suefuji, Hiratsuka (JP)

(73) Assignee: The Yokohama Rubber Co., Ltd., Kanagawa (JP)

(*) Notice: Subject to any disclaimer, the term of this patent is extended or adjusted under 35 U.S.C. 154(b) by 49 days.

(21) Appl. No.: 18/998,241

(22) PCT Filed: Apr. 27, 2023

(86) PCT No.: PCT/JP2023/016699
§ 371 (c)(1),
(2) Date: Jan. 24, 2025

(87) PCT Pub. No.: WO2024/062669
PCT Pub. Date: Mar. 28, 2024

(65) Prior Publication Data

US 2026/0042612 A1 Feb. 12, 2026

(30) Foreign Application Priority Data

Sep. 20, 2022 (JP) ................................ 2022-148691

(51) Int. Cl.
*B65G 15/34* (2006.01)

(52) U.S. Cl.
CPC .... *B65G 15/34* (2013.01); *B65G 2812/02198* (2013.01)

(58) Field of Classification Search
CPC .......... B65G 15/34; B65G 2812/02198; B65G 15/36
See application file for complete search history.

(56) References Cited

U.S. PATENT DOCUMENTS 4,650,068 A * 3/1987 Vanassche ............ B29C 70/224 474/271
4,839,220 A * 6/1989 Stijntjes ................ B65G 15/34 442/208

(Continued)

FOREIGN PATENT DOCUMENTS

JP H08-244405 A 9/1996
JP H09-239845 A 9/1997

(Continued)

*Primary Examiner* — Mark A Deuble
(74) *Attorney, Agent, or Firm* — Carrier, Shende & Associates P.C.; Joseph P. Carrier; Fulchand P. Shende

(57) ABSTRACT

A conveyor belt includes upper and lower cover rubbers respectively disposed on upper and lower sides of a core layer sandwiched therebetween, a breaker layer disposed between the core layer and the upper cover rubber, and the breaker layer has a structure including a fabric having warp threads extending in a belt longitudinal direction and weft threads extending in a belt width direction and upper and lower coating rubber layers respectively covering an upper surface and a lower surface of the fabric. The fabric has a fineness in the belt longitudinal direction of ≥26000 dtex/cm, a fineness in the belt width direction of ≥90000 dtex/cm, a tensile strength in the belt longitudinal direction of ≥2000 N/cm, and a tensile strength in the belt width direction of ≥6000 N/cm. The upper and lower coating rubber layers have a layer thickness of ≥0.5 mm.

5 Claims, 7 Drawing Sheets

(56) References Cited

U.S. PATENT DOCUMENTS

| | | | | |
|---|---|---|---|---|
| 5,425,985 | A | 6/1995 | Irvin | |
| 6,095,321 | A * | 8/2000 | Striegl | B65G 45/10 198/847 |
| 10,160,600 | B2 * | 12/2018 | Hou | D03D 1/0094 |
| 10,239,695 | B2 | 3/2019 | Miyajima et al. | |
| 10,442,624 | B2 * | 10/2019 | Hou | B65G 15/34 |
| 11,001,449 | B2 * | 5/2021 | Suzuki | B65G 15/34 |
| 2012/0053020 | A1 * | 3/2012 | Wright | B65G 15/34 521/137 |

FOREIGN PATENT DOCUMENTS

| | | | | |
|---|---|---|---|---|
| JP | 2017-019637 | A | 1/2017 | |
| JP | 2017-100848 | A | 6/2017 | |
| WO | WO-9500422 | A1 * | 1/1995 | D03D 15/573 |
| WO | WO-2018230072 | A1 * | 12/2018 | D03D 1/00 |

* cited by examiner

CONVEYOR BELT AND METHOD OF MANUFACTURING THE SAME

TECHNICAL FIELD

The present invention relates to a conveyor belt and a method of manufacturing the same and particularly relates to a conveyor belt that can have excellent shock resistance against an impact caused by a conveyed object fed onto an upper cover rubber even when the conveyor belt is in a low temperature state and a method of manufacturing the same.

BACKGROUND ART

Between an upper cover rubber and a lower cover rubber of a conveyor belt, a core layer that bears a tension acting on the conveyor belt is embedded. When a conveyed object is fed onto the upper cover rubber, an impact is applied thereto. To protect the core layer, a structure in which a protective fiber layer is embedded in the upper cover rubber has been proposed (see Patent Document 1).

Even when such a protective fiber layer is embedded, the larger the impact received from the fed conveyed object is, the more likely the core layer is to be damaged. This shortens the service life of the conveyor belt. The conveyor belt used in low temperature conditions, such as below freezing point, has lower impact resistance than the conveyor belt used at room temperature, and the lower the temperature, the lower the impact resistance. Therefore, there is room for improvement in having excellent shock resistance against an impact caused by a conveyed object fed onto the upper cover rubber even when the conveyor belt is in a low temperature state.

CITATION LIST

Patent Literature

Patent Document 1: JP 2017-19637 A

SUMMARY OF INVENTION

Technical Problem

An object of the present invention is to provide a conveyor belt that can have excellent shock resistance against an impact caused by a conveyed object fed onto an upper cover rubber even when the conveyor belt is in a low temperature state and a method of manufacturing the same.

Solution to Problem

To achieve the object described above, a conveyor belt according to an embodiment of the present invention includes: a core layer; an upper cover rubber and a lower cover rubber respectively disposed on an upper side and a lower side of the core layer sandwiched therebetween; and a breaker layer disposed at an upper position of the core layer. The breaker layer includes a fabric having warp threads extending in a belt longitudinal direction and weft threads extending in a belt width direction and an upper coating rubber layer and a lower coating rubber layer respectively covering an upper surface and a lower surface of the fabric. The breaker layer is disposed between the core layer and the upper cover rubber. The fabric has a fineness in the belt longitudinal direction of 26000 dtex/cm or more, a fineness in the belt width direction of 90000 dtex/cm or more, a tensile strength in the belt longitudinal direction of 2000 N/cm or more, and a tensile strength in the belt width direction of 6000 N/cm or more. The upper coating rubber layer and the lower coating rubber layer have a layer thickness of 0.5 mm or more. As used herein, “dtex” corresponds to the conventional meaning of dtex as an international metric unit of mass used to measure linear density of textile fibers and yarns.

A method of manufacturing a conveyor belt according to an embodiment of the present invention is a method of manufacturing a conveyor belt including a core layer disposed between an upper cover rubber and a lower cover rubber and a breaker layer disposed at an upper position of the core layer. A breaker member, which becomes the breaker layer, includes a fabric having warp threads extending in a belt longitudinal direction and weft threads extending in a belt width direction and an upper coating rubber layer unvulcanized and a lower coating rubber layer unvulcanized respectively covering an upper surface and a lower surface of the fabric. The fabric has a fineness in the belt longitudinal direction of 26000 dtex/cm or more, a fineness in the belt width direction of 90000 dtex/cm or more, a tensile strength in the belt longitudinal direction of 2000 N/cm or more, and a tensile strength in the belt width direction of 6000 N/cm or more. The method includes: molding a molded article including the core layer disposed between the upper cover rubber unvulcanized and the lower cover rubber unvulcanized and the breaker member disposed between the core layer and the upper cover rubber unvulcanized; vulcanizing the molded article, thereby integrating constituent members of the molded article; and manufacturing the conveyor belt in which the upper coating rubber layer unvulcanized and the lower coating rubber layer unvulcanized have a layer thickness of 0.5 mm or more.

Advantageous Effects of Invention

According to the present invention, since the breaker layer is disposed between the core layer and the upper cover rubber, the entire thickness of the upper cover rubber can function as a cushioning material against an impact caused by a conveyed object fed onto the upper cover rubber. This advantageously prevents damage to the breaker layer. Setting the fineness in the belt longitudinal direction, the fineness in the belt width direction, the tensile strength in the belt longitudinal direction, and the tensile strength in the belt width direction of the fabric within the above ranges allows the shock resistance of the fabric to greatly improve. Setting the layer thickness of the upper coating rubber layer and the lower coating rubber layer to 0.5 mm or more allows the breaker layer to be firmly integrated with the core layer and the upper cover rubber. As a result, excellent shock resistance of the breaker layer can be sufficiently exhibited, and even when the conveyor belt is in a low temperature state, the conveyor belt can obtain excellent shock resistance against an impact caused by a conveyed object fed onto the upper cover rubber. This advantageously avoids damage to the core layer and can lengthen the service life of the conveyor belt.

DESCRIPTION OF EMBODIMENTS

Figure 1:
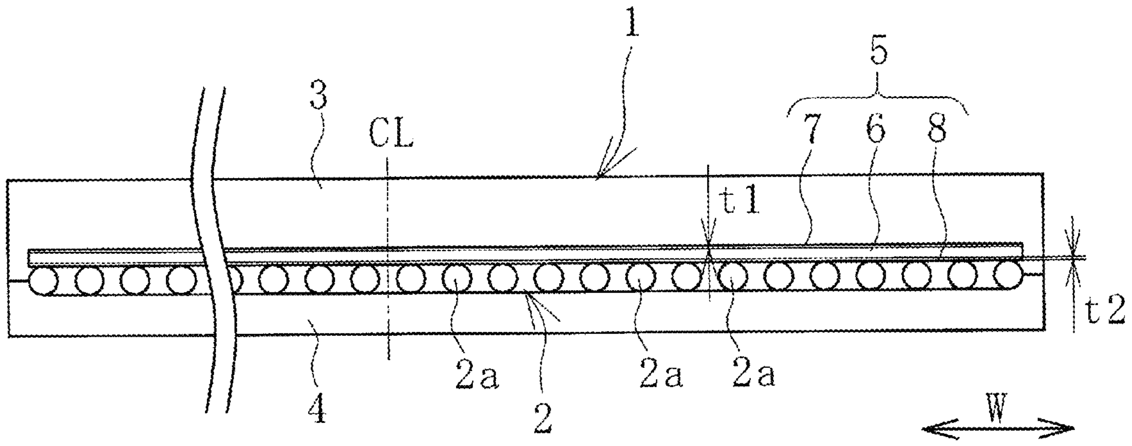
FIG. 1 is an explanatory diagram illustrating an embodiment of a conveyor belt in a cross-sectional view.

A conveyor belt and a method of manufacturing the conveyor belt according to embodiments of the present invention will be described below with reference to embodiments illustrated in the drawings. In the drawing, arrows W and L represent a belt width direction and a belt longitudinal direction, respectively, the dot-dash line CL represents the center in the belt width direction.

Figure 2:
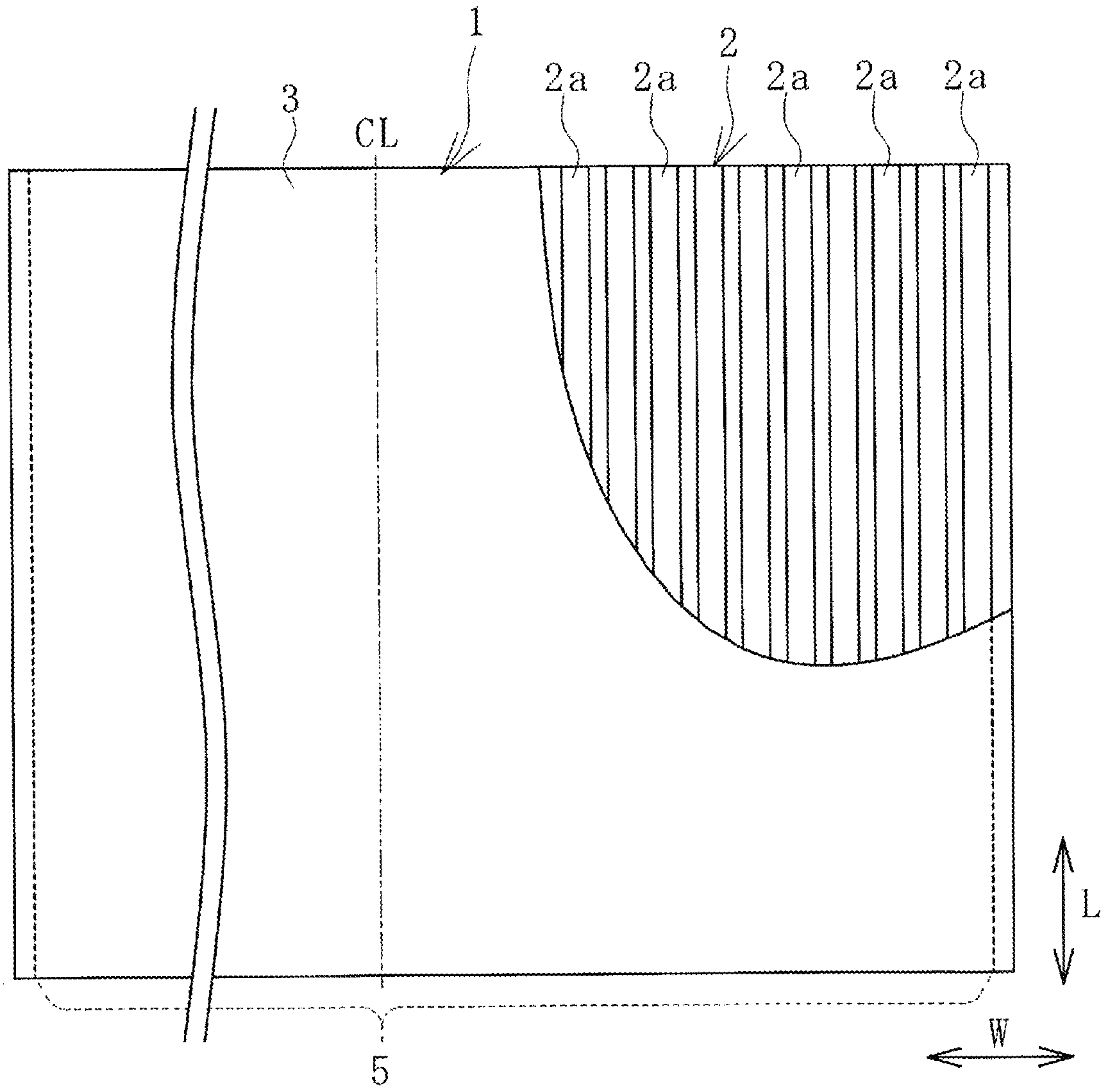
FIG. 2 is an explanatory diagram illustrating the conveyor belt of FIG. 1 with a partial cutout in a top view.
Figure 3:
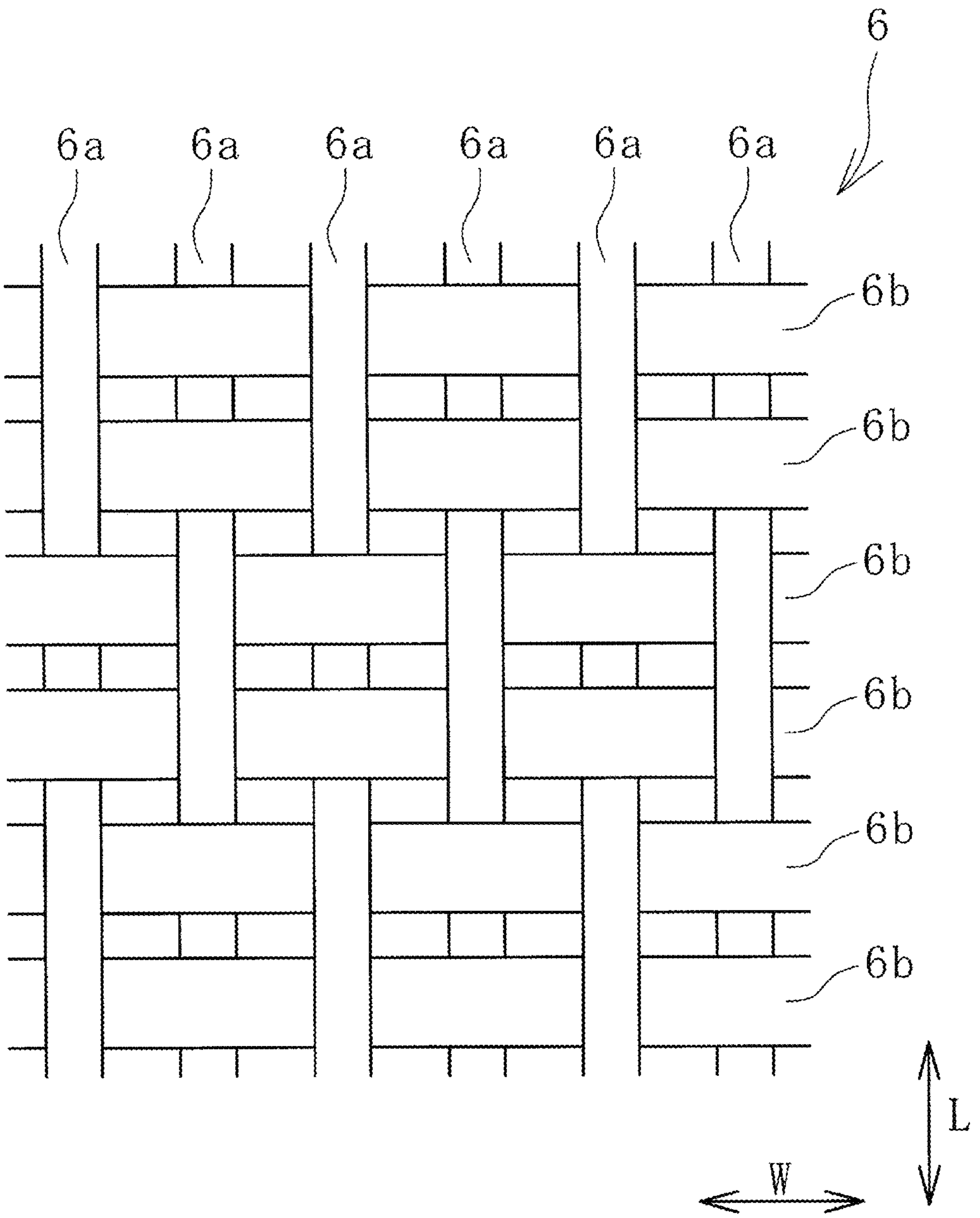
FIG. 3 is an explanatory diagram illustrating a fabric in FIG. 1 in a plan view.

The embodiment of the conveyor belt 1 illustrated in FIGS. 1 to 3 includes a core layer 2, an upper cover rubber 3 and a lower cover rubber 4 respectively disposed on an upper side and a lower side of the core layer 2 sandwiched therebetween, and a breaker layer 5 disposed between the core layer 2 and the upper cover rubber 3. In addition to these constituent members, the conveyor belt 1 includes known constituent members such as edge rubber disposed on each end portion in the belt width direction W as appropriate. The conveyor belt 1 is configured by integrating the above-described constituent members through a vulcanization step. FIG. 2 illustrates the conveyor belt 1 in a state where the upper cover rubber 3 and the breaker layer 5 are partially cut away to expose the core layer 2 (steel cord 2*a*).

The conveyor belt 1 is formed in an annular shape with a required length when used. In the annular conveyor belt 1, each of the lower cover rubber 4, the core layer 2, the breaker layer 5, and the upper cover rubber 3, which are layered in this order from an inner circumferential side to an outer circumferential side, extends over the entire length in the belt longitudinal direction L to form an annular shape.

The core layer 2 bears tension acting on the conveyor belt 1. The core layer 2 includes a plurality of steel cords 2*a* disposed side by side in the belt width direction W. These steel cords 2*a* are covered with cushion rubber. An outer diameter of the steel cord 2*a* is, for example, 6.0 mm or more and 15.0 mm or less. The density (cord/5 cm) of the steel cords 2*a* disposed side by side is, for example, 2 or more and 8 or less. The core layer 2 is disposed over substantially the entire width of the belt (95% or more of the belt width).

The cushion rubber is known adhesive rubber having excellent adhesiveness, and the layer thickness (coating thickness) of the cushion rubber is, for example, 0.5 mm or more and 4.0 mm or less on the upper side and the lower side of the steel cord 2*a*, respectively. As the cushion rubber, for example, natural rubber, styrene-butadiene rubber, butadiene rubber, or a combination of two or more thereof is used.

For the upper cover rubber 3 and the lower cover rubber 4, known rubber may be used that contains at least a diene rubber including natural rubber (acrylonitrile butadiene rubber may also be included when oil resistance is required), and carbon black to achieve good wear resistance. The layer thickness of the upper cover rubber 3 and the lower cover rubber 4 is determined as appropriate depending on the desired performance of the conveyor belt 1. The layer thickness of the upper cover rubber 3 is, for example, 10 mm or more and 45 mm or less, and the layer thickness of the lower cover rubber 4 is, for example, 5 mm or more and 35 mm or less.

The main function of the breaker layer 5 is to prevent damage to the core layer 2 to protect the core layer 2. The breaker layer 5 includes a fabric 6, and an upper coating rubber layer 7 and a lower coating rubber layer 8 covering the upper surface and the lower surface of the fabric 6, respectively. Since the tension acting on the conveyor belt 1 is basically borne by the core layer 2, the breaker layer 5 substantially does not bear the tension.

The breaker layer 5 is disposed at least in the central portion of the conveyor belt 1 in the belt width direction W. "Central portion in the belt width direction W" refers to an area in the central portion in the belt width direction W having from approximately 50% to 70% of the belt width. The breaker layer 5 is preferably disposed over substantially the entire belt width (95% or more of the belt width) so as to substantially cover the entire width of the upper surface of the core layer 2.

A layer thickness t1 of the upper coating rubber layer 7 and a layer thickness t2 of the lower coating rubber layer 8 are 0.5 mm or more, and in order to ensure even stronger adhesive strength, they are set to 1.0 mm or more. When the layer thicknesses t1 and t2 increase, the weight of the conveyor belt 1 also increases. Therefore, in order to avoid an excessive increase in weight, the upper limit thereof is, for example, 2.0 mm. Each layer thickness t1, t2 is basically the same but may also be different.

The upper coating rubber layer 7 and the lower coating rubber layer 8 are formed of the same known rubber, for example, natural rubber, butyl rubber, butadiene rubber, styrene-butadiene rubber, acrylonitrile butadiene rubber, or rubber obtained by blending a plurality of kinds of these rubber. The upper coating rubber layer 7 and the lower coating rubber layer 8 are firmly bonded to the fabric 6. The upper coating rubber layer 7 is firmly bonded to the upper cover rubber 3, and the lower coating rubber layer 8 is firmly bonded to the core layer 2.

As illustrated in FIG. 3, the fabric 6 includes warp threads 6*a* extending in the belt longitudinal direction L and weft threads 6*b* extending in the belt width direction W. The fabric 6 of FIG. 3 has a mat structure of a plain weave in which one of the warp threads 6*a* and two of the weft threads 6*b* are alternately and vertically crossed.

Figure 4:
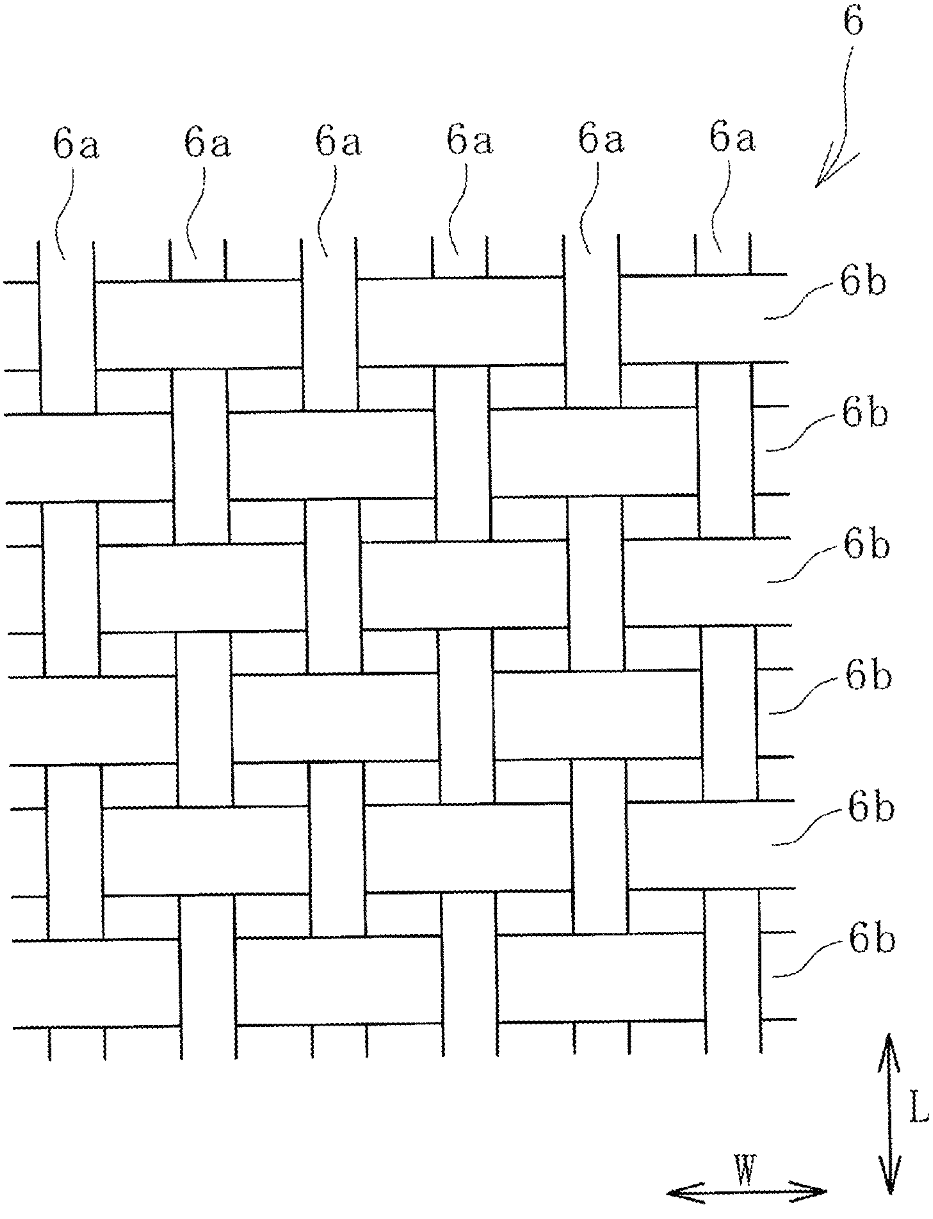
FIG. 4 is an explanatory diagram illustrating a modified example of the fabric in a plan view.

The fabric 6 is not limited to the mat structure illustrated in FIG. 3 and can adopt other structures including the warp threads 6*a* and the weft threads 6*b*. For example, as illustrated in FIG. 4, the fabric 6 can adopt a simple plain weave structure in which one of the warp threads 6*a* and one of the weft threads 6*b* are alternately and vertically crossed.

For materials of the warp threads 6*a* and the weft threads 6*b*, for example, polyamide resin such as nylon 6 and nylon 66 are employed. The warp threads 6*a* and the weft threads 6*b* have a twisted structure in which a plurality of yarns are intertwined. The fineness of the yarn is, for example, 900 dtex or more and 2500 dtex or less.

The fabric 6 is specially designed to have sufficient shock resistance. That is, a fineness D1 of the fabric 6 in the belt longitudinal direction L is 26000 dtex/cm or more, a fineness D2 of the fabric 6 in the belt width direction W is 90000 dtex/cm or more, a tensile strength F1 of the fabric 6 in the belt longitudinal direction L is 2000 N/cm or more, and a tensile strength F2 of the fabric 6 in the belt width direction W is 6000 N/cm or more. To avoid an increase in weight and a decrease in flexibility of the conveyor belt 1, upper limits of the fineness D1 and the fineness D2 are, for example, 35000 dtex/cm and 110000 dtex/cm, respectively, and upper limits of the tensile strength F1 and the tensile strength F2 are, for example, 3000 N/cm and 7000 N/cm, respectively.

The fineness D1 and D2 are values calculated by the following formulas.

Fineness $D1$=a total fineness $d1$(dtex) of the warp thread $6a$×density (number of threads/5 cm) of the warp thread $6a$÷5

Fineness $D2$=a total fineness $d2$(dtex) of the weft thread $6b$×density (number of threads/5 cm) of the weft thread $6b$÷5

The total fineness d1 (dtex) of the warp thread 6*a* is the fineness (dtex) of the yarn constituting the warp thread 6*a*×number of the yarns, and the total fineness d2 (dtex) of the weft thread 6*b* is the fineness (dtex) of the wire strand constituting the weft thread 6*b*×the number of the yarns.

The warp thread 6*a* has, for example, a 1400 dtex/n structure in which n (n=2 to 4) yarns with the fineness of 1400 dtex are intertwined or a 2100 dtex/n structure in which n (n=2 to 3) yarns with the fineness of 2100 dtex are intertwined.

The weft thread 6*b* has, for example, a 1400 dtex/n/m structure in which n (n=7 to 10) yarns with the fineness of 1400 dtex are intertwined and m (m=2 to 3) sets of the intertwined n yarns are intertwined or a 2100 dtex/n/m structure in which n (n=5 to 8) yarns with the fineness of 2100 dtex are intertwined and m (m=2 to 3) sets of the intertwined n yarns are intertwined.

The density (thread/5 cm) of the warp thread 6*a* is, for example, 50 or more and 70 or less. The density (thread/5 cm) of the weft thread 6*b* is, for example, 8 or more and 12 or less.

The tensile strengths F1 and F2 are measured based on the tensile strength test specified in JIS L 1096, and are values obtained by dividing the breaking load of a test piece (length 400 mm, width 10 mm) of the fabric 6 by the width of the test piece. In this test, the tensile speed is 200 mm/min and the clamp interval is 200 mm.

The known fabric has the fineness D1 of less than 10000 dtex/cm, the fineness D2 of less than 35000 dtex/cm, the tensile strength F1 of less than 700 N/cm, and the tensile strength F2 of less than 2000 N/cm. Therefore, in this embodiment, the finenesses D1 and D2, the tensile strength F1, and the tensile strength F2 are all significantly higher than those of the known fabric, and the fabric 6 has high rigidity.

Figure 5:
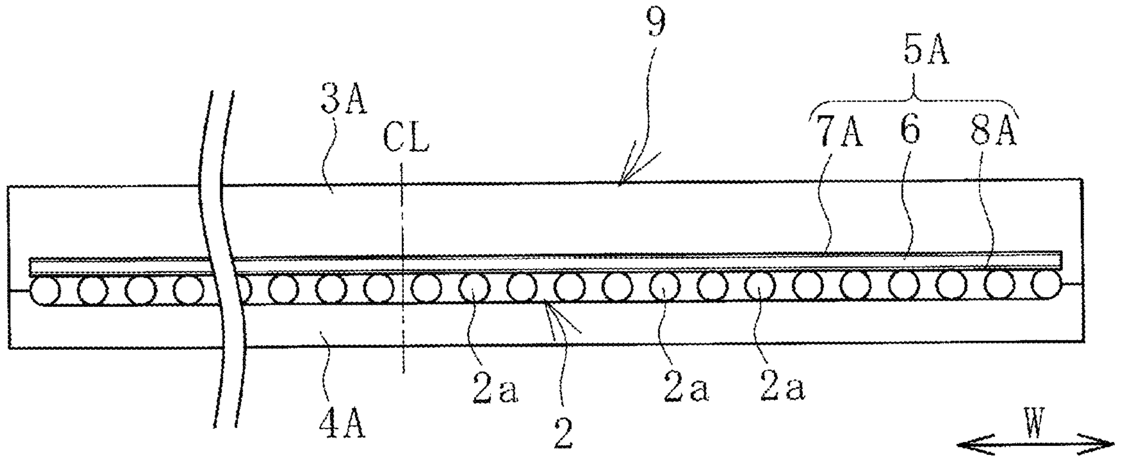
FIG. 5 is an explanatory diagram illustrating a molded article molded in a molding step of the conveyor belt in a cross-sectional view.

In order to manufacture the conveyor belt 1 described above, a molded article 9 illustrated in FIG. 5 is molded. To mold the molded article 9, an unvulcanized upper cover rubber 3A, an unvulcanized lower cover rubber 4A, the core layer 2, and a breaker member 5A are used. The breaker member 5A includes the fabric 6, and an unvulcanized upper coating rubber layer 7A and an unvulcanized lower coating rubber layer 8A covering the upper surface and the lower surface of the fabric 6, respectively.

Then, for example, the core layer 2, the breaker member 5A, and the unvulcanized upper cover rubber 3A are sequentially layered on the unvulcanized lower cover rubber 4A, and the molded article 9 is molded. Alternatively, the breaker member 5A, the core layer 2, and the unvulcanized lower cover rubber 4A may be sequentially layered on the unvulcanized upper cover rubber 3A, and the molded article 9 may be molded. That is, the molded article 9 of FIG. 5 may be molded by a known method using the above-described constituent members.

Next, the molded article 9 is vulcanized using a known vulcanization device. Through the vulcanization step, the unvulcanized rubber constituting the molded article 9 is vulcanized, and the constituent members are bonded and integrated to form the conveyor belt 1. The breaker member 5A becomes the breaker layer 5 through the vulcanization step, and the layer thicknesses of the unvulcanized upper coating rubber layer 7A and the unvulcanized lower coating rubber layer 8A are respectively set to become the above-described layer thickness t1 and layer thickness t2 after the vulcanization. The layer thickness of each of the unvulcanized upper coating rubber layer 7A and the unvulcanized lower coating rubber layer 8A may be set based on the result of a preliminary vulcanization test or the like. The layer thickness of the unvulcanized upper coating rubber layer 7A and the unvulcanized lower coating rubber layer 8A are slightly greater than the layer thickness t1 and the layer thickness t2, respectively.

Figure 6:
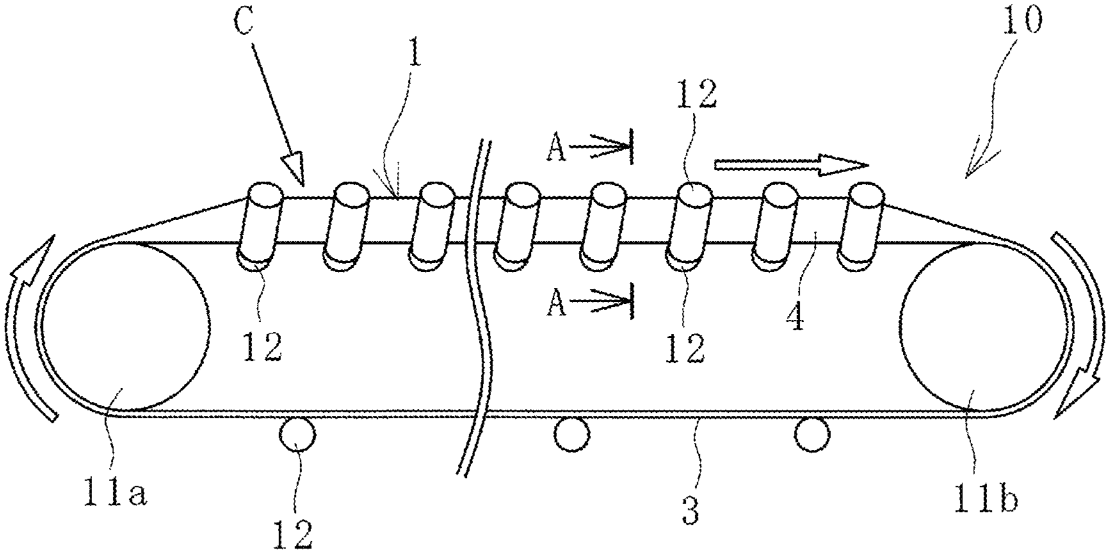
FIG. 6 is an explanatory diagram illustrating an embodiment of the conveyor belt mounted on a conveyor device in a side view.
Figure 7:
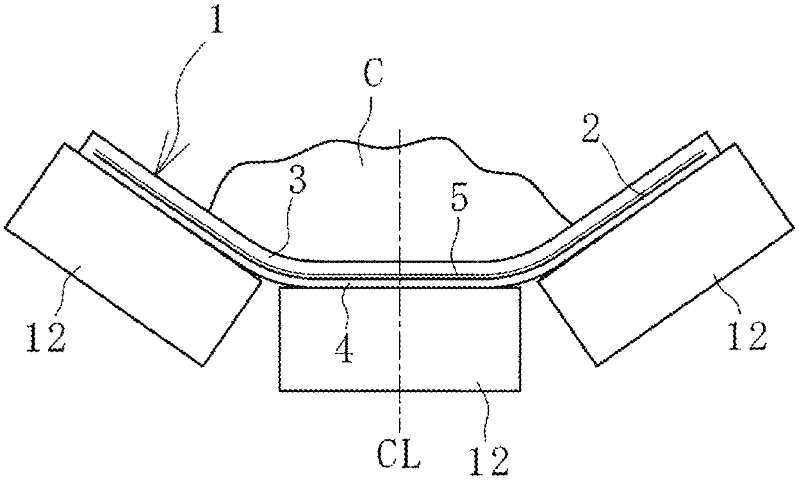
FIG. 7 is a cross-sectional view taken along line A-A of FIG. 6.

The required length of the manufactured conveyor belt 1 is formed into an annular shape, and is then, as illustrated in FIGS. 6 and 7, mounted on a conveyor device 10 and used. In the conveyor device 10, the conveyor belt 1 is mounted between a pair of pulleys 11*a* and 11*b*. On a carrying side of the conveyor device 10, the lower cover rubber 4 of the conveyor belt 1 is supported by a plurality of support rollers 12, making the lower cover rubber 4 a trough shape protruding downward. Therefore, the conveyed object C fed onto the upper cover rubber 3 is mainly placed on the central portion in the belt width direction. On a return side of the conveyor device 10, the upper cover rubber 3 is supported by the plurality of support rollers 12.

In the conveyor belt 1, since the breaker layer 5 is disposed between the core layer 2 and the upper cover rubber 3, the impact received by the conveyed object C fed onto the upper cover rubber 3 can be alleviated and absorbed by the entire thickness of the upper cover rubber 3. That is, the upper cover rubber 3 can function as a cushioning material to the maximum extent. Therefore, even if the conveyor belt 1 is in a low temperature state below freezing point, the impact can be effectively alleviated and absorbed, allowing the breaker layer 5 to be less likely to be damaged. This advantageously prevents damage to the core layer 2.

The fineness D1 and the fineness D2 of the fabric 6 are set to 26000 dtex/cm or more and 90000 dtex/cm or more, respectively, and the tensile strength F1 and the tensile strength F2 of the fabric 6 are set to 2000 N/cm or more and 6000 N/cm or more, respectively. That is, the rigidity of the fabric 6 is increased, and the shock resistance thereof is greatly improved as compared with those of conventional ones.

Furthermore, by setting the layer thicknesses t1, t2 of the upper coating rubber layer 7 and the lower coating rubber layer 8 to 0.5 mm or more, the breaker layer 5 can be firmly integrated with the core layer 2 and the upper cover rubber 3. By setting the layer thicknesses t1, t2 to 1.0 mm or more, the breaker layer 5 can be further firmly integrated with the core layer 2 and the upper cover rubber 3. The breaker layer 5 is less likely to be debonded from the peripheral constituent members, allowing the excellent shock resistance of the breaker layer 5 to be sufficiently exhibited. As a result, even when the conveyor belt 1 is in a low temperature state, the conveyor belt 1 can obtain excellent shock resistance against an impact from the outside. This advantageously avoids damage to the core layer 2 and can lengthen the service life of the conveyor belt 1.

The conveyor belt 1 may be used in an environment of −20° C. or less. Under such low temperature conditions, the shock resistance of the conveyor belt 1 decreases due to the effect of low temperature brittleness of the rubber. In this conveyor belt 1, disposing the breaker layer 5 between the core layer 2 and the upper cover rubber 3 and setting the layer thicknesses t1, t2 of the upper coating rubber layer 7 and the lower coating rubber layer 8 in the above-described range by using the fabric 6 having the above-described special specifications can achieve the shock resistance for practical use even in a use environment of −20° C. or less (for example, a use environment down to about −50° C.).

In the conveyor belt 1, the fineness D2 is much greater than the fineness D1, and accordingly, the tensile strength F2 is much greater (three times or more) than the tensile strength F1. This advantageously prevents longitudinal tearing of the conveyor belt 1. Even if the longitudinal tearing occurs, the longitudinal tearing length can be minimized. When the fabric 6 has the woven structure (mat structure) illustrated in FIG. 3, a higher effect of suppressing longitudinal tearing of the conveyor belt 1 can be expected as compared with the simple plain woven structure illustrated in FIG. 4.

As illustrated in FIG. 6, the conveyor belt 1 travels while repeatedly bending around the pulleys 11*a* and 11*b*. At the time of bending, the core layer 2 becomes a neutral plane, tensile force is generated on the outer circumferential side of the core layer 2, and compression force is generated on the inner circumferential side of the core layer 2. Therefore, if there is a member having high rigidity at a position more distant from the core layer 2 in the arc-shaped bending state in the radial direction, the bending rigidity is increased and the flexibility is reduced. The conveyor belt 1 has the breaker layer 5 having rigidity higher than those of conventional ones, and the breaker layer 5 is not embedded in the upper cover rubber 3 but arranged adjacent to the core layer 2. Therefore, the breaker layer 5 is present at a position closer to the core layer 2 in the arc-shaped bending state in the radial direction. This advantageously avoids a decrease in the flexibility of the conveyor belt 1.

As illustrated in FIG. 7, on the carrying side of the conveyor device 10, the conveyor belt 1 is deformed into a trough shape that moderately protrudes downward in order to place the conveyed object C thereon. In this way, even when the conveyor belt 1 is deformed into a trough shape, the core layer 2 serves as a neutral plane. Therefore, although the conveyor belt 1 includes the breaker layer 5 having higher rigidity than that of the conventional conveyor belt, a decrease in the trough property of the conveyor belt 1 (difficulty in deformation into a trough shape) is advantageously avoided. To maintain good flexibility and trough properties of the conveyor belt 1, the breaker layer 5 can also be brought closer to the core layer 2 by making the thickness t2 of the lower coating rubber layer 8 smaller than the thickness t1 of the upper coating rubber layer 7.

EXAMPLES

As shown in Table 1, six types of breaker layers having different specifications (Conventional Example, Comparative Examples 1 to 2, and Examples 1 to 3) were prepared, and the tensile strength F1 in the belt longitudinal direction (extending direction of the warp thread) and the tensile strength F2 in the belt width direction (extending direction of the weft thread) were measured for each fabric thereof. The tensile strengths F1 and F2 are measurement values obtained by the test method described above.

The upper cover rubber and the cushion rubber were layered on the breaker layer which was formed by covering the upper and lower sides of each fabric with a coating rubber layer (the layer thicknesses t1 and t2 were set to be the same) with the breaker layer sandwiched therebetween, and vulcanized under common conditions and integrated to prepare adhesive test pieces. Debonding strength was measured using each adhesive test piece in accordance with JIS K 6256-1:2013 "Adhesion to textile fabric". The test results are as shown in Table 1. The debonding strength between the breaker layer and the cushion rubber corresponds to the debonding strength between the breaker layer and the core layer.

TABLE 1

| | | | | Conventional | Example | | | Comparative Example | |
|---|---|---|---|---|---|---|---|---|---|
| | | | | Example | 1 | 2 | 3 | 1 | 2 |
| Breaker layer | Fabric | Warp thread | Material | Nylon 66 | | | | | |
| | | | Structure | 940 dtex/1 | 1400 dtex/2 | | | | |
| | | | Density (Thread/5 cm) | 44.0 | 56.4 | | 57.1 | 56.9 | 56.4 |
| | | Weft thread | Material | Nylon 66 | | | | | |
| | | | Structure | 1400 dtex/3/2 | 2100 dtex/8/3 | | | 1400 dtex/10/3 | 2100 dtex/8/3 |
| | | | Density (Thread/5 cm) | 19.0 | 10.0 | | | 9.6 | 10.0 |
| | | Woven structure | | FIG. 3 | | | FIG. 4 | FIG. 3 | |
| | | Thickness (mm) | | 1.05 | 2.9 | | 3.0 | 2.6 | 2.9 |
| | | Fineness D1 (dtex/cm) | | 8272 | 31584 | | 31976 | 31864 | 31584 |
| | | Fineness D2 (dtex/cm) | | 31920 | 100800 | | | 80640 | 100800 |
| | | Tensile strength F1 (N/cm) | | 546 | 2240 | | 2598 | 2410 | 2261 |
| | | Tensile strength F2 (N/cm) | | 1860 | 6500 | | 6419 | 5735 | 6500 |

TABLE 1-continued

| | | Conventional Example | Example 1 | Example 2 | Example 3 | Comparative Example 1 | Comparative Example 2 |
|---|---|---|---|---|---|---|---|
| Coating rubber layer | Material | NR/SBR/BR | | | | | |
| | Layer thickness t1, t2 (mm) | 0.3 | 1.5 | 0.8 | | 1.5 | 0.4 |
| Upper cover rubber | | NR/SBR/BR, layer thickness of 16 mm | | | | | |
| Cushion rubber | | NR/SBR/BR, upper and lower layer thicknesses of 1 mm | | | | | |
| Debonding strength between breaker layer and upper cover rubber (N/mm) | | 11 | 18 | 17 | 18 | 17 | 9 |
| Debonding strength between breaker layer and cushion rubber (N/mm) | | 11 | 19 | 18 | 18 | 18 | 17 |

When the tensile strengths F1 and F2 are 2000 N/cm or more and 6000 N/cm or more, respectively, it can be evaluated that the shock resistance for practical use is sufficiently provided even at a temperature below freezing point. When the debonding strength between the fabric, the upper coating rubber layer, and the lower coating rubber layer is 10.5 N/mm or more, it can be evaluated that the fabric has sufficient adhesiveness for practical use even at a temperature below freezing point.

From the results shown in Table 1, in Examples 1 to 3, the tensile strengths F1 and F2 are significantly improved and the debonding strength between the fabric, the upper coating rubber layer, and the lower coting rubber layer is also significantly improved as compared with Conventional Example. In Examples 1 to 3, the tensile strengths F1 and F2 are 2000 N/cm or more and 6000 N/cm or more, respectively, and sufficient shock resistance can be expected even below freezing point. Since the debonding strength between the fabric, the upper coating rubber layer, and the lower coating rubber layer is sufficiently excellent, allowing the excellent shock resistance of the fabric to be exhibited without being impaired.

REFERENCE SIGNS LIST

1 Conveyor belt
2 Core layer
2*a* Steel cord
3 Upper cover rubber
3A Unvulcanized upper cover rubber
4 Lower rubber cover
4A Unvulcanized lower cover rubber
5 Breaker layer
5A Breaker member
6 Fabric
6*a* Warp thread
6*b* Weft thread
7 Upper coating rubber layer
7A Unvulcanized upper coating rubber layer
8 Lower coating rubber layer
8A Unvulcanized lower coating rubber layer
9 Molded article
10 Conveyor device
11*a*, 11*b* Pulley
12 Support roller
C Conveyed object

The invention claimed is:

1. A conveyor belt, comprising:
a core layer;
an upper cover rubber and a lower cover rubber respectively disposed on an upper side and a lower side of the core layer sandwiched therebetween; and
a breaker layer disposed at an upper position of the core layer;
the breaker layer comprising a fabric having warp threads extending in a belt longitudinal direction and weft threads extending in a belt width direction and an upper coating rubber layer and a lower coating rubber layer respectively covering an upper surface and a lower surface of the fabric, the breaker layer being disposed between the core layer and the upper cover rubber,
the fabric having a fineness in the belt longitudinal direction of 26000 dtex/cm or more, a fineness in the belt width direction of 90000 dtex/cm or more, a tensile strength in the belt longitudinal direction of 2000 N/cm or more, and a tensile strength in the belt width direction of 6000 N/cm or more, and
the upper coating rubber layer and the lower coating rubber layer having a layer thickness of 0.5 mm or more.

2. The conveyor belt according to claim 1, wherein the upper coating rubber layer and the lower coating rubber layer have the layer thickness of 1.0 mm or more.

3. The conveyor belt according to claim 1, wherein the fabric has a mat structure in which one of the warp threads and two of the weft threads are alternately and vertically crossed.

4. A method of manufacturing a conveyor belt comprising a core layer disposed between an upper cover rubber and a lower cover rubber and a breaker layer disposed at an upper position of the core layer,
a breaker member, which becomes the breaker layer, comprising a fabric having warp threads extending in a belt longitudinal direction and weft threads extending in a belt width direction and an upper coating rubber layer unvulcanized and a lower coating rubber layer unvulcanized respectively covering an upper surface and a lower surface of the fabric, and
the fabric having a fineness in the belt longitudinal direction of 26000 dtex/cm or more, a fineness in the belt width direction of 90000 dtex/cm or more, a tensile strength in the belt longitudinal direction of 2000 N/cm or more, and a tensile strength in the belt width direction of 6000 N/cm or more,
the method comprising:
molding a molded article comprising the core layer disposed between the upper cover rubber unvulcanized and the lower cover rubber unvulcanized and the breaker member disposed between the core layer and the upper cover rubber unvulcanized;
vulcanizing the molded article, thereby integrating constituent members of the molded article; and manufacturing the conveyor belt in which the upper coating rubber layer unvulcanized and the lower coating rubber layer vulcanized have a layer thickness of 0.5 mm or more.

5. The conveyor belt according to claim 2, wherein the fabric has a mat structure in which one of the warp threads and two of the weft threads are alternately and vertically crossed.

* * * * *